Figure 1:
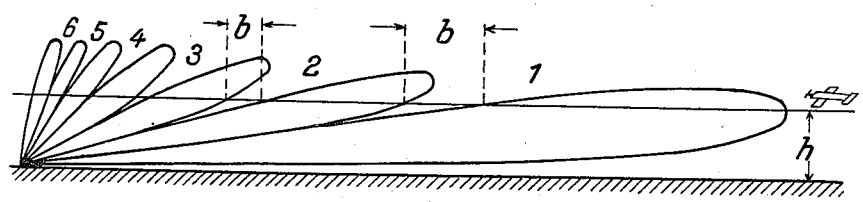

May 20, 1941.  W. M. HAHNEMANN  2,242,910
RADIO CONTROL SYSTEM FOR GUIDING AIRCRAFT
Filed Dec. 13, 1938

Inventor:
Walter Max Hahnemann
by E. D. Phinney
Att'y

Patented May 20, 1941

2,242,910

UNITED STATES PATENT OFFICE

2,242,910

RADIO CONTROL SYSTEM FOR GUIDING AIRCRAFT

Walter Max Hahnemann, Berlin, Germany, assignor to C. Lorenz Aktiengesellschaft, Berlin-Tempelhof, Lorenzweg, Germany, a company Application December 13, 1938, Serial No. 245,362
In Germany December 10, 1937

9 Claims. (Cl. 250—11)

It is well known to use high frequency waves as a means for guiding aircraft. Such radio control usually serves to indicate to the pilot a certain direction to be followed by the aeroplane or other aircraft. This method may be effected either with the air of non-directional transmitting stations and directional receivers or with the aid of directive transmitting stations and non-directional receivers. In the operation of these arrangements it has been found convenient to use ultra-short waves, such as waves in the order of magnitude of meters, because in such case the antenna arrangements are of very small dimensions while, in addition, this wave range has advantages as regards the spreading properties of the radiation. A special advantage here is that the range of radiation is sufficiently limited to enable such stations to be operated on the same wave lengths without influencing one another. Such limitation is due to the fact that these waves mainly follow optical laws. Methods of this kind are particularly suitable in cases where aeroplanes are to be aided when landing, only a small radiation range being necessary to such end. Many cases, however, require these ultra-short wave arrangements not only to serve for landing purposes but also to serve for guiding aeroplanes when traversing substantial distances, such as the distance between two airports. In order here to increase the range of radiation, it has been proposed not to erect the transmitting antennae directly on the ground but to mount them on high towers. An antennae arrangement so mounted, however, is spaced from the ground by a multiple of the operating wave length. As a result, not only a radiation emanating directly from the transmitting antenna will be effective, but also a so-called indirect radiation, that is, an antenna radiation reflected by the ground and interfering with the direct radiation. This entails that the radiation does not spread uniformly, thus creating zero zones spaced from the transmitting station by different distances, that is, zones in which any reception is prevented by the mutual influence of the direct and indirect radiations. The vertical radiation diagram of such a transmitting arrangement hence is not semi-circular or club-shaped, as would be desirable, but is subdivided in a manner to form lobes or leaves. In this way zero zones are formed between the lobes of the radiation diagram. Such subdivision is, therefore, in the nature of a disturbing effect.

The invention seeks to utilize this disturbing effect by employing it for ascertaining the distance by which an aeroplane is spaced from the transmitting station toward which it is flying. In addition, the invention aims to do away with the drawback that the possibility of direction finding is impaired by the said zero zones.

The invention will be understood from the following description, reference being had to the accompanying drawing in which—

Figure 2:
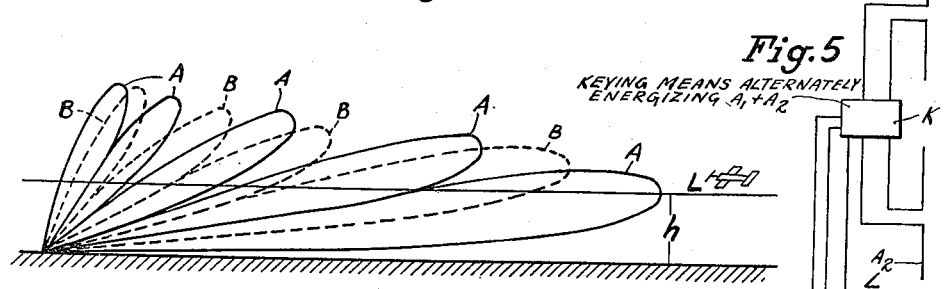
Figure 3:
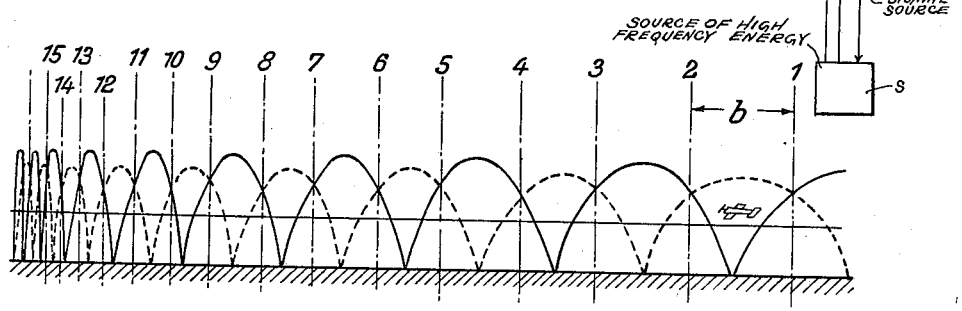
Figure 4:
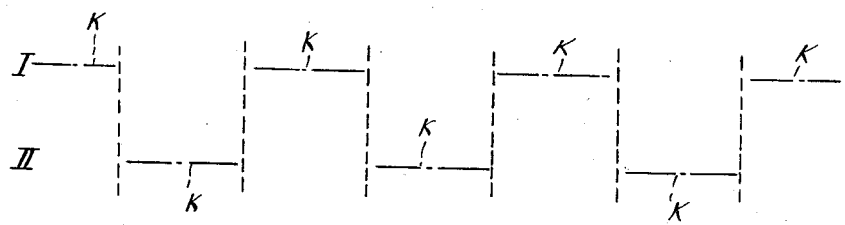

Fig. 1 is a vertical radiation diagram of the kind produced heretofore; Fig. 2 shows an example of a vertical radiation diagram of the kind provided by the invention; Figs. 3 and 4 are graphic representations which serve to explain the operation of systems according to the invention and Fig. 5 diagrammatically illustrates an antenna arrangement for producing field patterns in accordance with the invention.

As shown in Fig. 1, the vertical radiation diagram used heretofore is in the shape of lobes between which there are zero zones 1 to 6, for instance, spaced from the transmitting station by distances which with a certain flying altitude $h$ can be determined by experiment or calculation.

In the case of arrangements having a radiation diagram of the kind represented in Fig. 1 the number of the zero zones traversed by the aeroplane and the width $b$ thereof may serve to ascertain the distance between the aeroplane and transmitting station. It will be seen from Fig. 1 that the widths $b$ are the smaller the nearer they are to the transmitter. A calculating method based on the number and width of the zero zones, however, would involve that during the periods of the aeroplane flying through the zero zones no direction finding would be possible, the orientation with respect to the transmitter thus getting lost. This proposal, therefore, is not practicable.

By the invention an arrangement is disclosed that enables the distance in question to be determined by the aforesaid multi-lobe radiation diagram and which also enables a perfect direction finding. In accordance with the invention it is proposed to produce two multi-lobe radiation diagrams in such manner that the maxima of one diagram coincide with the minima of the other diagram. The zones in which the aeroplane changes from one diagram to the other are utilized for ascertaining the said distance. The two radiations are alternately produced by a keying operation effected in the rhythm of specific signals and in such a manner that the signals of one radiation are given during the intervals of the other radiation.

As shown in Fig. 2, the invention provides for producing two multi-lobe radiation diagrams A, B. Diagram A is represented in full lines, while diagram B is shown dotted. The maxima of one diagram accord with the minima of the second diagram. Therefore, an aeroplane arriving at level $h$ along line L will fly across the lower lobe of diagram A, then across the lower lobe of diagram B, thereupon across the second lobe of diagram A, and so on. Whilst the aeroplane is traversing the diagram of one transmitter, the pilot only hears the characteristic signal of this transmitter. He will then traverse a zone in which both signals are heard at the same time, and thereupon the signals of the other kind will be audible.

The mode of action of the novel method will now be explained with reference to Figs. 3 and 4.

In Fig. 3 the intensity of the fields of the transmitting antennae is not represented as a vector diagram, such diagram being shown in Fig. 2, but rectangular co-ordinates are used here to illustrate the dependency of this field intensity upon the distance. One of the two diagrams so represented is shown in full lines, while the other is shown dotted. It will be seen from the representation that the maxima of each diagram accord with the minima of the other diagram. The two diagrams are alternately produced in well-known manner, namely, by a keying operation so performed that the signals peculiar to one diagram are given in the periods of no keying of the other diagram.

The keying operation is illustrated in Fig. 4. The signals I are those of one antenna field, while the signals II belong to the other antenna field. When the aeroplane is flying within the first diagram, the pilot hears the signal I, whereas in the other diagram the signal II is audible. In the point of intersection of the two both signals are heard simultaneously, that is to say, the pilot will continually hear Morse signals $k$ here shown by way of example. When approaching the zone of overlap of two lobes, that is, a zone in which both signals are heard simultaneously, one signal will preponderate increasingly. The pilot then arrives in the zone where both signals are heard simultaneously, and after traversing this zone the first signal will be of decreasing intensity. In accordance with the invention these signal changes are summed up, and from the number of such changes and the position in which they occur, this position being a known item, the distance by which the aeroplane is spaced from the transmitting station may be ascertained. As there are no minimum zones, signals being continually audible, also direction finding may at any time be effected apart from the distance finding.

The zones of signal change are indicated in Fig. 3 by vertical lines $1, 2, 3, 4 \ldots$ The distances by which these zones are spaced apart are the smaller the nearer they are to the transmitter, that is to say, toward the transmitting station the signal changes are increasing in frequency. This allows the pilot in advance to estimate the distance in question.

The described keying method may still be improved in such manner that the two antenna fields are not produced in the rhythm of signals of the same kind, but shall be produced in the rhythm of signals of different kinds, one kind serving for the production of one diagram, while the other kind serves to generate the other diagram. In this way the pilot will be able at any time to ascertain which is the antenna whose zone he is traversing. In this connection either different Morse signals or different modulating or carrier frequencies may be employed. In the case of different keying signals the principle of complementary signals, which is customary in connection with another purpose, may be used, that is, a method may be employed which is based on the use of two kinds of signals, one kind being produced in the intervals between the signals of the other kind, as is the case, for instance, with the Morse signals $a$ and $n$ or with dots and dashes. Such method has the advantage that a continuous tone is heard in the zones of equal field intensity of the two signals. This tone is particularly easy to observe and is counted for ascertaining the distance in question. It is not necessary, however, to employ the slow keying effected in the rhythm of Morse signals, but a high frequency may be used for keying, such, for example, as a frequency not within the audible range, the signal change being ascertained with the aid of electrical or electromechanic devices.

The transmitting arrangement for producing the two different lobe diagrams may be an antenna arrangement of a type well known per se for example as shown in Fig. 5. As the maxima of one transmission diagram are to accord with the minima of the other diagram the simplest manner of effecting the invention consists in keying two antenna systems $A_1$, $A_2$ which are located at different levels above ground and, compared with the wave length, are positioned at a substantial height. Since the number, shape and position of the lobes vary in accordance with the height at which the transmitting antenna is arranged above ground, it will be easy to obtain the desired radiation diagram by choosing this height accordingly. A source of high frequency energy S, which may be modulated or otherwise controlled to produce distinctive signals by means of signal source S, is connected alternately to $A_1$, $A_2$, by keying means K. If different distinctive signals are transmitted from the separate antennae some means such as L is provided to control the signal in accordance with the antenna energized.

The counting of the signal changes, which is done in order to ascertain the distance by which the aeroplane is spaced from the transmitter, is in the simplest case effected merely by hearing the received signals. However, automatic counting devices, well known per se, such, for example, as counting mechanisms or the like of known type, may be employed to such end, or the amplitude of the received signals may be represented in well known manner on a recording tape.

As regards the direction finding to be performed at the same time as the calculation of the said distance there is likewise no limitation to the use of definite methods. For instance, a well known principle may be adopted that consists in alternately producing transmitter fields which are of different directions in the horizontal plane and whose intensities are compared with each other, this being the principle spoken of as guide beam method. Furthermore, directional receivers, such, for instance, as the so-called aim-flight receivers, may be employed.

What is claimed is:

1. In a system of guiding aircraft by the radiation of a high frequency transmitter system, the method comprising producing multi-lobe radiation diagram having a plurality of maximum and minimum regions in a vertical plane, producing a second multi-lobe radiation diagram having a plurality of maximum and minimum regions in said vertical plane, the maxima of said second radiation diagram corresponding with the minima of said first named pattern to provide overlapping zones of predetermined length and spacing in a horizontal direction in which the aircraft moves from one diagram to the other, and obtaining by traversing these zones to determine their length the distance of the airplane from the said transmitter.

2. A method as defined in claim 1, further comprising generating said two radiation diagrams by alternately producing two kinds of signal radiations so that the signals of one kind are given in the intervals between the signals of the other kind.

3. A method as defined in claim 1, further comprising producing said two radiation diagrams alternately in the rhythm of Morse signals of the same kind.

4. A method as defined in claim 1, further comprising impressing on said two radiation diagrams different characteristic signals.

5. A method as defined in claim 1, further comprising producing said radiation diagrams alternately, and impressing on said diagrams different distinguishing keying frequencies.

6. A method as defined in claim 1, further comprising producing said two radiation diagrams alternately by means of signals adapted to complete each other to form a continuous signal.

7. A method as defined in claim 1, further comprising counting the said overlap zones to determine the distance traversed.

8. A system for guiding aircraft comprising a first means for radiating energy from a point above the earth's surface to produce a first radiation diagram having a plurality of radiation lobes of particular widths forming a plurality of mixima and minima radiation zones at different angles in a given vertical plane, a second means for radiating energy from a point above the earth's surface to produce a second radiation pattern having a plurality of radiation lobes of particular width, forming maxima and minima radiation zones at angles differing from said first named angles in said vertical plane coinciding with the minima and maxima respecticely of said first radiation pattern, whereby alternate overlapping zones of predetermined length and spacing are produced in the horizontal direction from said radiation means, and means for imparting to said radiation patterns distinctive signal indications, whereby the length of said spacings may be determined to provide an indication of the distance from said radiation means.

9. A system for guiding aircraft according to claim 8, further comprising means for alternately energizing said first and second radiating means.

WALTER MAX HAHNEMANN.